United States Patent
Mihara

(10) Patent No.: US 11,698,943 B2
(45) Date of Patent: Jul. 11, 2023

(54) MAPPING SUPPORT APPARATUS, MAPPING SUPPORT METHOD AND PROGRAM

(71) Applicant: NIPPON TELEGRAPH AND TELEPHONE CORPORATION, Tokyo (JP)

(72) Inventor: Yoshiyuki Mihara, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 40 days.

(21) Appl. No.: 17/612,339

(22) PCT Filed: May 21, 2019

(86) PCT No.: PCT/JP2019/020170
§ 371 (c)(1),
(2) Date: Nov. 18, 2021

(87) PCT Pub. No.: WO2020/235020
PCT Pub. Date: Nov. 26, 2020

(65) Prior Publication Data
US 2022/0245215 A1 Aug. 4, 2022

(51) Int. Cl.
*G06F 16/00* (2019.01)
*G06F 16/9538* (2019.01)

(52) U.S. Cl.
CPC .............. *G06F 16/9538* (2019.01)

(58) Field of Classification Search
CPC ........... G06F 16/9538; G06Q 30/0201; G06Q 30/0629; G06Q 30/0635
See application file for complete search history.

(56) References Cited

U.S. PATENT DOCUMENTS

2014/0058984 A1* 2/2014 Shinzato ............... G06N 20/00
706/12

FOREIGN PATENT DOCUMENTS

| JP | 2004118476 A | * | 4/2004 |
| JP | 2004192423 A | * | 7/2004 |
| JP | 2011-129006 A | | 6/2011 |

* cited by examiner

*Primary Examiner* — Jared M Bibbee

(57) ABSTRACT

A mapping support apparatus includes a search unit that performs a web search by using a part or a whole of dictionary mapping target data as a search key, and performs a search on a predetermined classification dictionary using a part or a whole of the dictionary mapping target data as a search key, a UI providing unit that displays a screen including a search result of the web search and a search result of the predetermined classification dictionary, and a data creation unit that applies, to the dictionary mapping target data, classification information selected by a user from the search result of the predetermined classification dictionary.

6 Claims, 10 Drawing Sheets

| | | | JICFS CLASSIFICATION STANDARDS | |
|---|---|---|---|---|
| 2 | 3 | 23 | 03 | LIP BALM | MOISTURIZING LIP BALM (LIP BALM FOR MOISTURIZATION AND PREVENTING CHAPPING) UV-CUT LIP BALM (SUNSCREEN LIP BALM) COLOR LIP BALM (COLORED LIP BALM) |

(a)

| PURCHASE DATA | | |
|---|---|---|
| KOSHA (EACH COMPANY) CATEGORY | PRODUCT CODE | PRODUCT NAME |
| SKIN CARE | 4511413302163 | ABC MEDICATED LIP BALM 1.5G |

(c)

| PURCHASE DATA | | | COMMON CATEGORY | |
|---|---|---|---|---|
| KOSHA (EACH COMPANY) CATEGORY | PRODUCT CODE | PRODUCT NAME | COMMON LARGE CATEGORY | COMMON SMALL CATEGORY |
| SKIN CARE | 4511413302163 | ABC MEDICATED LIP BALM 1.5G | COSMETICS | LIP BALM |

Fig. 5

| KOSHA (EACH COMPANY) LARGE CATEGORY | KOSHA (EACH COMPANY) SMALL CATEGORY | PRODUCT CODE | PRODUCT NAME |
|---|---|---|---|
| SKIN CARE | SKIN CARE | 4511413302163 | ABC MEDICATED LIP BALM 1.5G |

Fig. 7

| KOSHA (EACH COMPANY) LARGE CATEGORY | PRODUCT CODE | PRODUCT NAME | COMMON LARGE CATEGORY | COMMON SMALL CATEGORY |
|---|---|---|---|---|
| SKIN CARE | 4511413302163 | ABC MEDICATED LIP BALM 1.5G | COSMETICS | LIP BALM |

Fig. 10

| KOSHA (EACH COMPANY) LARGE CATEGORY | KOSHA (EACH COMPANY) SMALL CATEGORY | PRODUCT CODE | PRODUCT NAME |
|---|---|---|---|
| SKIN CARE | SKIN CARE | 4511413302163 | ABC MEDICATED LIP BALM 1.5G |

· WEIGHT

| LOW ▶ |
|---|

MAPPING SUPPORT APPARATUS, MAPPING SUPPORT METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/020170, filed on 21 May 2019, the disclosure of which is hereby incorporated herein by reference in its entirety.

TECHNICAL FIELD

The present invention relates to a technique of applying classification information that corresponds to the meaning of data, to the data.

BACKGROUND ART

Recently, an effort is made to collect and analyze various types of data (for example, purchase data, lodging data, people flow data, medical data, traffic data, and the like) and utilize them for business activities, administrative activities, and the like.

In order to utilize data for business activities, administrative activities, and the like, it is desirable that the meaning of data collected from various retailers and the like is commonly understandable.

Therefore, for example, it is considered to map classification information of a standard classification dictionary, such as JICFS classification standards, to collected data. JICFS classification means "product classification codes" set so as to enable efficient use of registered JAN code (world product code) product information. JICFS classification codes are mainly used as "search keys" for extracting necessary product groups from a large quantity of product information, and as "aggregate keys" for grouping similar products and for easy processing in aggregation, processing, and analysis of various types of data.

As a citation relating to meaning classification application, Patent Literature 1 has been known.

CITATION LIST

Patent Literature

Patent Literature 1: Japanese Patent Laid-Open No. 2011-129006

SUMMARY OF THE INVENTION

Technical Problem

However, in order to determine what category, in the classification dictionary, the collected data (referred to as dictionary mapping target data) means (product, service, and the like), there is a problem in that it takes a great deal of time manually.

The present invention has been made in view of the point described above. An object of the present invention is to provide a support technique that enables effective detection of a category corresponding to dictionary mapping target data, from a classification dictionary.

Means for Solving the Problem

According to the disclosed technique, provided is a mapping support apparatus including:

a search unit that performs a web search by using a part or a whole of dictionary mapping target data as a search key, and performs a search on a predetermined classification dictionary using a part or a whole of the dictionary mapping target data as a search key;

a UI providing unit that displays a screen including a search result of the web search and a search result of the predetermined classification dictionary; and a data creation unit that applies, to the dictionary mapping target data, classification information selected by a user from the search result of the predetermined classification dictionary.

Effects of the Invention

According to the technique of the disclosure, provided is a support technique that enables effective detection of a category corresponding to dictionary mapping target data, from a classification dictionary.

BRIEF DESCRIPTION OF DRAWINGS

FIG. 1 is an drawing for explaining work contents as preconditions.

FIG. 5 illustrates an example of a screen displayed by a UI providing unit 110.

FIG. 7 illustrates an example of a screen displayed by the UI providing unit 110.

FIG. 10 illustrates an example of a screen displayed by the UI providing unit 110.

DESCRIPTION OF EMBODIMENTS

Figure 2:
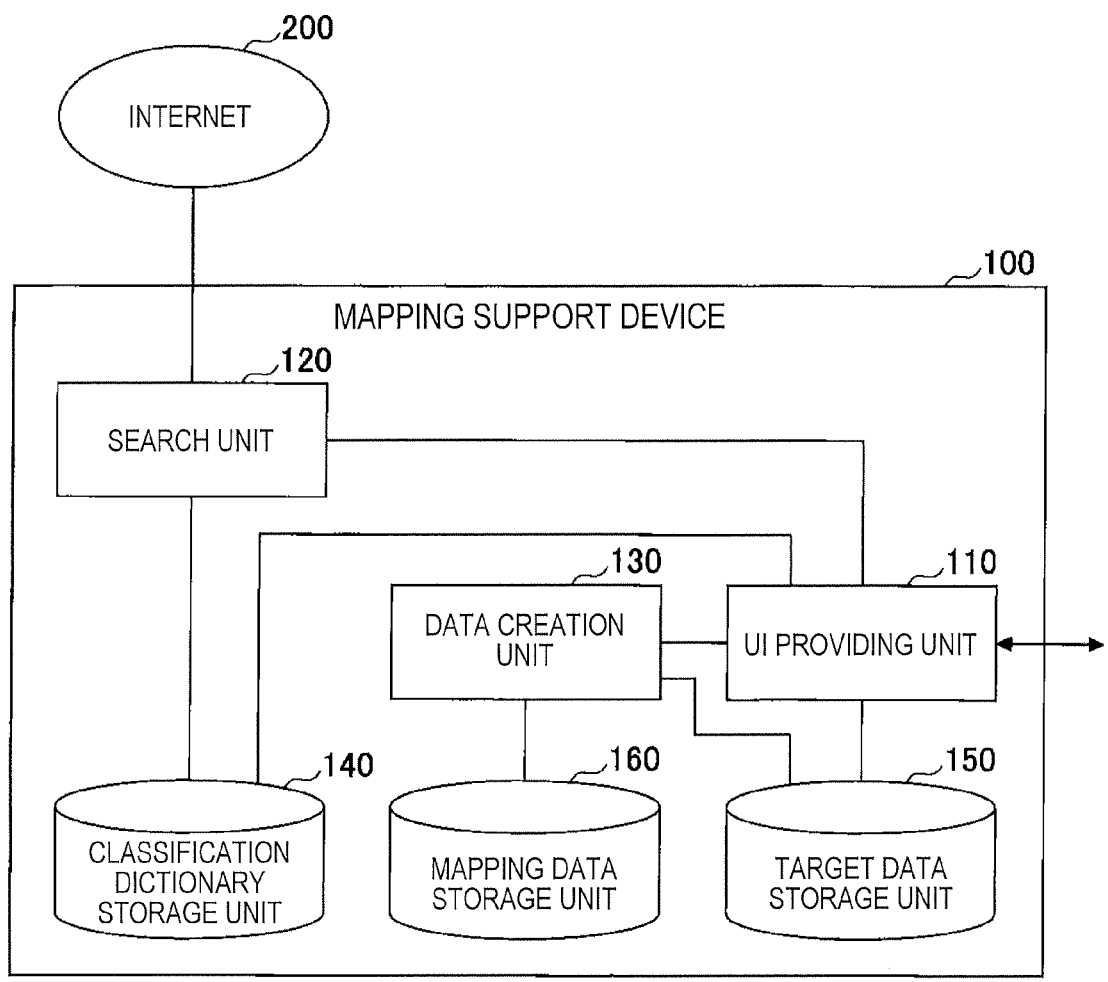
FIG. 2 is a function configuration diagram of a mapping support apparatus 100 in an embodiment of the present invention.

Hereinafter, an embodiment of the present invention (present embodiment) will be described with reference to the drawings. An embodiment described below is a mere example, and embodiments to which the present invention is applied is not limited to the embodiment described below.

In the present embodiment, as an example of dictionary mapping target data, purchase data of products collected from retailers and the like is used, and as an example of a classification dictionary, JICFS classification standards are used. However, they are mere examples. The present invention is applicable without being limited to product purchase data and the JICFS classification standards. Hereinafter, "JICFS classification standards" is referred to as "classification standards".

Work Contents as Preconditions

Before explaining the present embodiment, a mapping work to be supported by the technique of the present embodiment will be described with reference to FIG. 1.

FIG. 1(a) illustrates purchase data of products collected from retailers and the like, which is an example of dictionary mapping target data. The purchase data illustrated in FIG. 1(a) includes kosha (each company) category, product code, and product name of each product corresponding to the purchase data. The kosha (each company) category shows a classification (category) applied to the product by the retailer. Product code and product name are a product identification number such as a JAN code applied to the product, and the product name of the product, respectively.

FIG. 1(b) shows classification standards (extract) that is an example of a classification dictionary. In the classification standards, products are classified into a large category (for example, food), a middle category (for example, processed food, . . . ), a small category (for example, seasonings, . . . ), and a fine category (for example, soy source, . . . ), and a classification code is applied to each category. In the example of FIG. 1(b), "2 3 23 03" shows, from the left, a classification code for a large category, a classification code for a middle category, a classification code for a small category, and a classification code for a fine category. Each category has a category name. Food, processed food, seasonings, and soy source, mentioned above, are examples of category names for the corresponding categories. Furthermore, "lip balm" in FIG. 1(b) is also an example of a category name.

Further, as illustrated in FIG. 1(b), in the classification standards, description (classification standards) indicating conditions for classifying a product to the category of the category name is described on the right side of the category name.

In the technique according to the present embodiment, an object is to search the classification standards for an appropriate category corresponding to the purchase data illustrated in FIG. 1(a), and as illustrated in FIG. 1(c), apply classification information indicating the classification to the purchase data.

In the example illustrated in FIG. 1(c), classification information to be applied is called "common category", and the detailed contents are a "common large category" and a "common small category". Note that the case where classification information to be applied includes two types namely a "common large category" and a "common small category" is a mere example. Further, to which of a large category, a middle category, a small category, and a fine category of the classification standards each of the two types ("common large category" and "common small category") corresponds, may be determined arbitrarily. Further, it is also possible to apply the four types, namely the large category, the middle category, the small category, and the fine category, of the classification standards, as they are. Moreover, as classification information, a classification code may be applied, or a category name may be applied, or both may be applied.

When an attempt is made to perform mapping (application of classification information) as described above without using the technique of the present invention, for example, a user first searches the classification standards using the product name of purchase data. In the case of a search using a product name including "lip balm", as one of search results, a category part of the category name "lip balm" of the classification standards is found. However, whether or not the product of the purchase data can be classified to the category name "lip balm" is not determined yet.

Then, the user checks the description on the right side of the category name "lip balm" in the classification standards, and checks whether or the product of the purchase data satisfies the condition for being classified to the category name "lip balm". At that time, it must be known what the product of the purchase data likes. This is because it is difficult to apply accurate category only with the product name. For example, in the case where the content of the product is lip balm of OTC drug type, even though the product name is "lip balm", regarding the category name, it must be categorized as "other agents for dental and oral use" rather than "lip balm". Moreover, there is a case where the product cannot be understood with a glance of the product name of the purchase data such as "03A series". Therefore, the user performs web search using the product name or the product code, for example. Then, the user looks at the description of the search result of the product obtained through web search to check whether or not the product of the purchase data satisfies the condition for being classified to the category name "lip balm".

In the checking as described above, when it is found that the condition is satisfied, the category name "lip balm" is applicable to the purchase data.

However, if it is found that the product of the purchase data is excluded from the category name "lip balm", the user must find another search result of "lip balm" with respect to the classification standards, or find another search result of web search, to find out the category in the classification standards corresponding to the product of the purchase data.

In the work described above, web search and classification standard search are performed alternately or similar search is performed a number of times, which is a time-consuming work.

Hereinafter, a technique of supporting mapping an appropriate category in the classification standards to purchase data will be described as the present embodiment.

Device Configuration

FIG. 2 illustrates an example of a function configuration of a mapping support apparatus 100 in the present embodiment. As illustrated in FIG. 2, the mapping support apparatus 100 includes a UI providing unit 110, a search unit 120, a data creation unit 130, a classification dictionary storage unit 140, a target data storage unit 150, and a mapping data storage unit 160. As illustrated in FIG. 2, the mapping support apparatus 100 is connected to the Internet 200. The function outline of each unit is as described below.

The UI providing unit 110 displays a screen of a user interface (UI) for mapping support, to a user. The UI providing unit 110 includes a function of receiving an input from a user. Note that the UI providing unit 110 may or may not include a function for screen display such as a display. In the case where the UI providing unit 110 does not include a function for screen display such as a display, for example, the UI providing unit 110 transmits screen information of the UI to a terminal connected over the network, and allows the terminal to display the UI screen. "The UI providing unit 110 displays a UI screen" includes the meaning that "the UI providing unit 110 transmits screen information of the UI to a terminal connected over the network and allows the terminal to display the UI screen".

The search unit 120 performs a search on a web server on the Internet 200 (web search). The search unit 120 also performs a search on the classification dictionary stored in the classification dictionary storage unit 140.

The data creation unit 130 performs processing of storing mapping data, obtained by applying classification information selected by a user to dictionary mapping target data, in the mapping data storage unit 160, and the like.

The classification dictionary storage unit 140 stores a classification dictionary. In the present embodiment, the classification dictionary is classification standards. The target data storage unit 150 stores dictionary mapping target data. In the present embodiment, dictionary mapping target data is purchase data. The mapping data storage unit 160 stores mapping data obtained by applying classification information to the dictionary mapping target data.

Note that each of the classification dictionary storage unit 140, the target data storage unit 150, and the mapping data storage unit 160 may be provided outside the mapping support apparatus 100 (for example, on the Internet 200).

The mapping support apparatus 100 of the present embodiment may be implemented by, for example, causing a computer to execute a program describing the processing contents described in the present embodiment. The computer may be a physical machine or a virtual machine.

The mapping support apparatus 100 can be implemented by execution of a program corresponding to processing to be performed by the mapping support apparatus 100, with use of hardware resources such as a CPU and a memory embedded in the computer. The program may be recorded on a computer-readable recording medium (portable memory or the like) to be stored and distributed. Moreover, the program may be provided over the network such as the Internet or electric mail.

Figure 3:
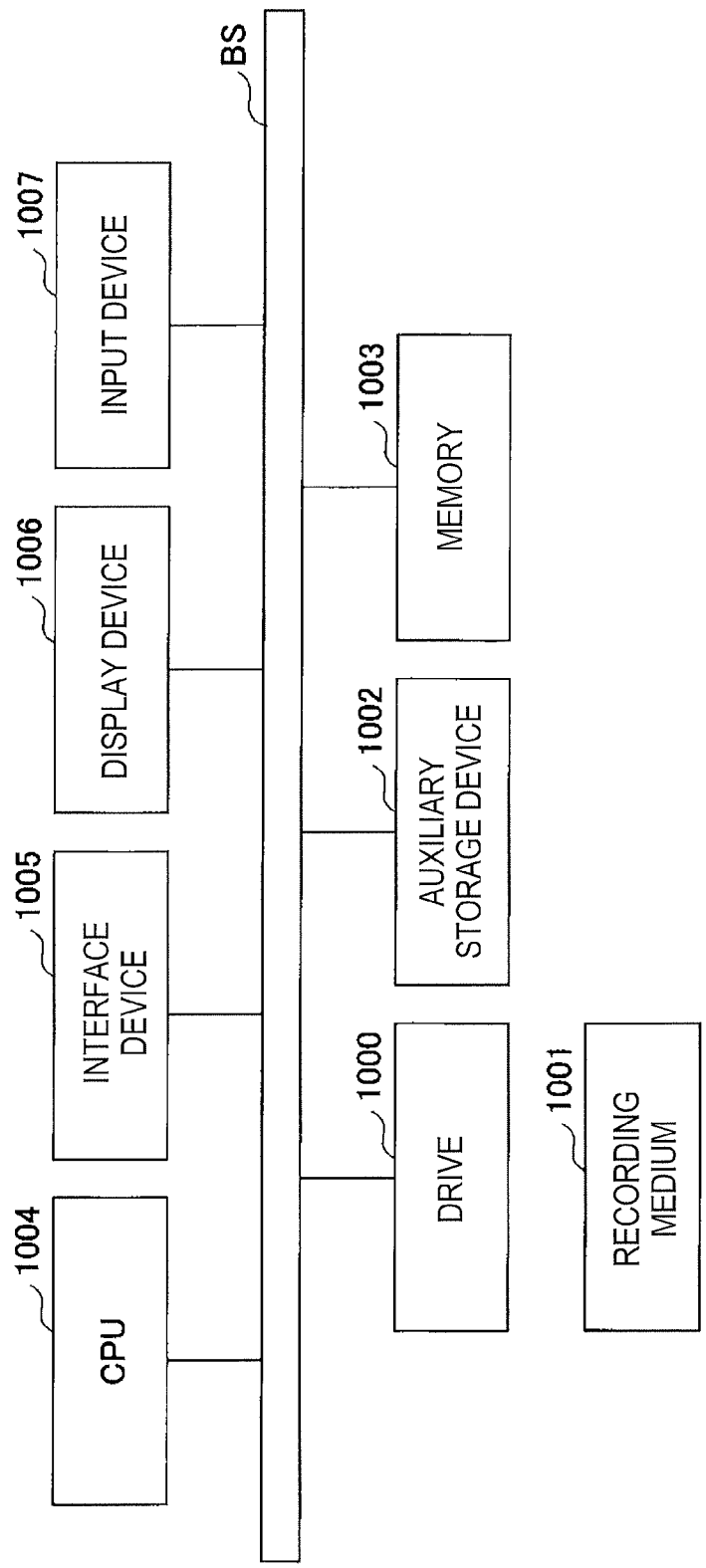
FIG. 3 is a diagram illustrating an example of a hardware configuration of the mapping support apparatus 100.

FIG. 3 illustrates an example of a hardware configuration of the computer according to the present embodiment. The computer illustrated in FIG. 3 includes a drive 1000, an auxiliary storage device 1002, a memory 1003, a CPU 1004, an interface device 1005, a display device 1006, an input device 1007, and the like which are connected to each other via a bus B.

The program for realizing processing by the computer is provided by, for example, a recording medium 1001 such as a CD-ROM or a memory card. When the recording medium 1001 in which the program is stored is set to the drive 1000, the program is installed from the recording medium 1001 to the auxiliary storage device 1002 via the drive 1000. However, the program is not necessarily installed from the recording medium 1001. It may be downloaded from another computer over the network. The auxiliary storage device 1002 stores the installed program and also necessary files, data, and the like.

The memory 1003 reads a program from the auxiliary storage device 1002 when an instruction to start the program is made, and stores it. The CPU 1004 realizes functions according to the mapping support apparatus 100 in accordance with the program stored in the memory 1003. The interface device 1005 is used as an interface for connecting to the network. The display device 1006 displays a graphical user interface (GUI) or the like by the program. The input device 1007 is configured of a keyboard and a mouse, buttons, a touch panel, or the like, and is used for inputting various operational instructions.

Exemplary Operation

Figure 4:
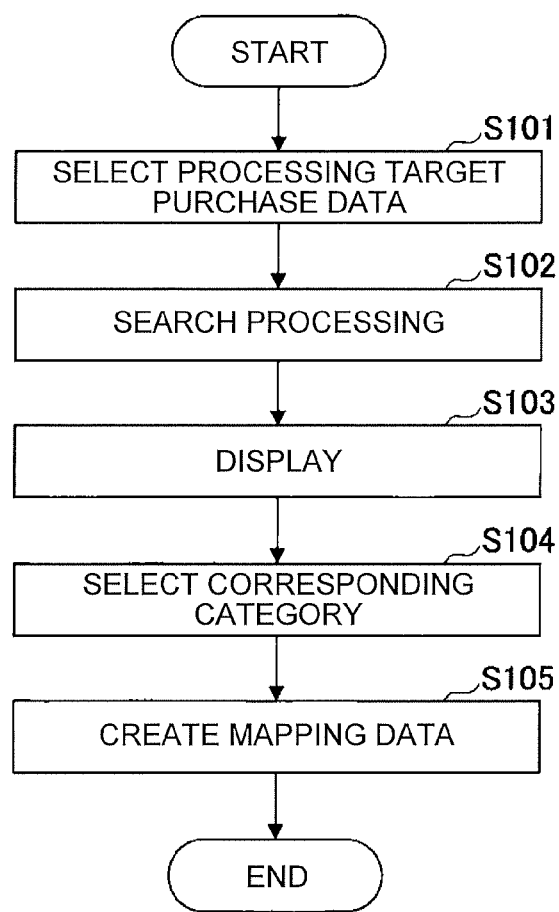
FIG. 4 is a flowchart for explaining processing procedures.

Next, an exemplary operation for mapping using the mapping support apparatus 100 will be described along the procedures shown in the flowchart of FIG. 4.

It is assumed that a list of purchase data is shown on the screen by the UI providing unit 110. At S101, a user selects a piece of purchase data that to which classification information is to be applied, from the list of purchase data shown.

FIG. 5 shows an example of purchase data shown at this point. The selected purchase data is transmitted to the search unit 120.

At S102, the search unit 120 performs a web search by using a part or a whole of the purchase data as a search key, and performs a search on the classification standards stored in the classification dictionary storage unit 140 using a part or a whole of the purchase data as a search key.

In the example illustrated in FIG. 5, the purchase data is configured of a plurality of items (items may be referred to as columns). In the case of using part of the purchase data, the search unit 120 may allow the user to select which part (item, word, or the like) is to be used from the screen illustrated in FIG. 5. Such selection may or may not be common in the web search and the classification standard search.

In the case of performing a search by using a plurality of items as search keys, the search unit 120 performs a search by connecting the items of the plurality of items using AND. This includes the case where performing a search by arranging respective items (words) with spaces between them is equivalent to performing a search by connecting them with AND. Further, it is also possible to allow a user to designate a search using a condition such as AND, OR, NOT, or the like.

When the data (for example, product name of purchase data) used as a search key is configured of a plurality of words, the search unit 120 divides the data into respective words, and performs a web search and a search on the classification standards with use of the divided words. It is also possible to allow the user to designate a word to be used. When the data is divided into respective words, an existing natural language processing technique such as morphological analysis, keyword extraction, or the like may be used.

The search processing performed by the search unit 120 is an existing technique. For example, the search unit 120 can find documents (or parts of documents) including a word or a sentence matching (or close to) one or a plurality of words given as search keys from the search targets, and display a plurality of documents (parts of documents) in the descending order of the degree of conformance to the search keys, via the UI providing unit 110.

Figure 6:
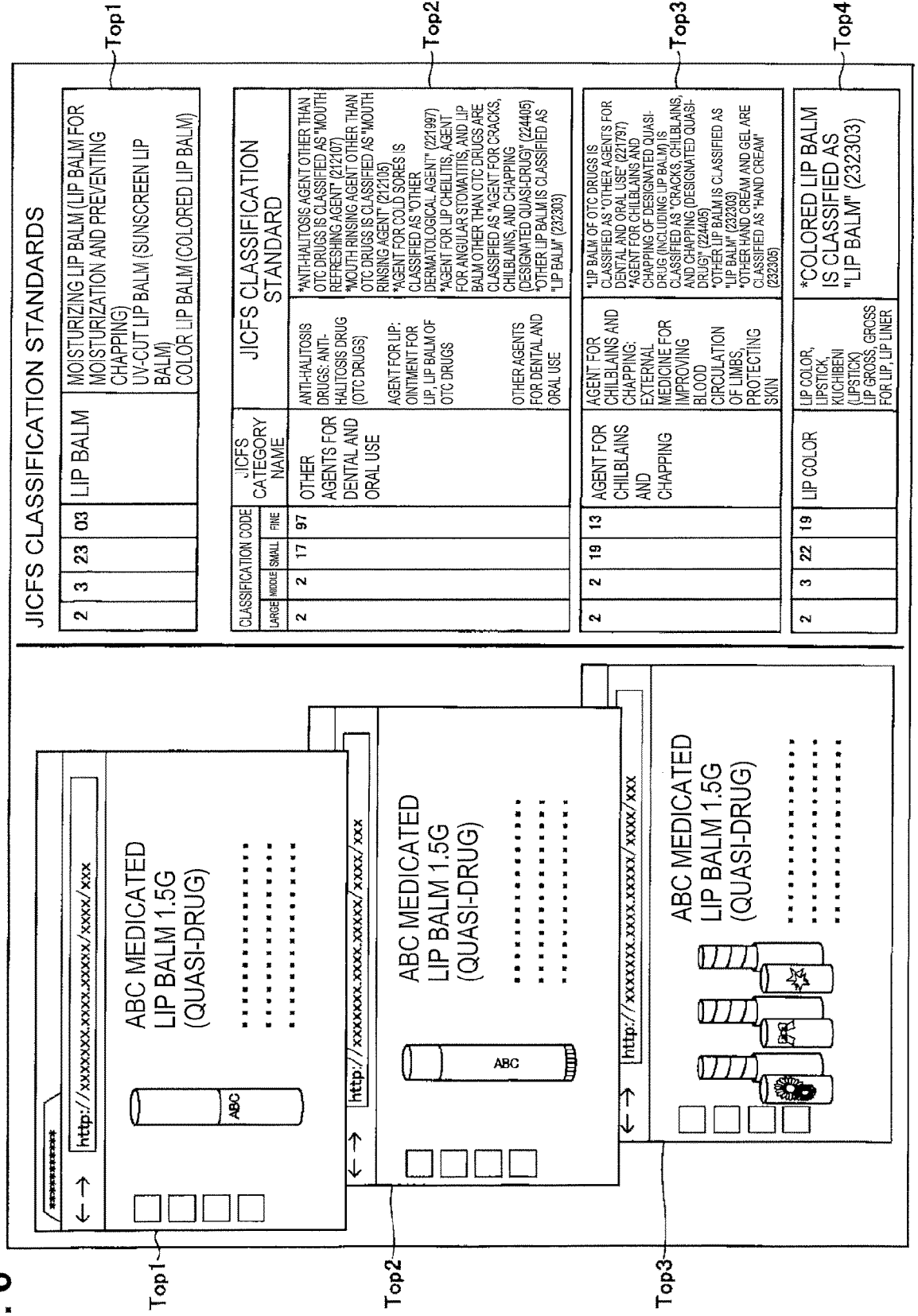
FIG. 6 illustrates an example of a screen displayed by the UI providing unit 110.

At S103, the UI providing unit 110 displays the search results of S102. FIG. 6 illustrates an example of a screen display of search results shown by the UI providing unit 110. As illustrated in the example of FIG. 6, web search results are shown on the left side of the screen, and classification standards search results are displayed on the right side of the screen. The size (area) of the left side of the screen (web search result) and the size (area) of the right side of the screen (classification standards) can be set and change arbitrarily.

As illustrated in FIG. 6, as web search results, three search results namely Top 1, Top 2, and Top 3 are shown in the descending order of the degree of conformance. In general, the UI providing unit 110 shows N pieces (N☐0) of search results. N can be set by the user. Note that even if N is large, all of the N pieces can be placed on one screen when they are shown in an overlapping manner. The user can check N pieces of search results by selecting a window appropriately.

Further, as illustrated in FIG. 6, as classification standards search results, four search results namely Top 1, Top 2, Top 3, and Top 4 are shown in the descending order of the degree of conformance. The four search results are the entire search results obtained through the search processing.

As described above, in the case of the classification standards, it is desirable to show the entire search results, unlike the case of a web search. This is because in the case of mapping a product to a classification item, it is impossible to perform accurate classification without reading all items that may correspond. For example, in the description column of the classification standards of FIG. 6, it is described that "lip balm of OTC drug type is classified as "other agents for dental and oral use", "agent for chilblains and chapping of designated quasi-drug (including lip balm) is classified as "cracks, chilblains, and chapping (designated quasi-drug)", and the like. Here, when the content of the product that is a dictionary mapping target is "lip balm for preventing cracks, chilblains, and chapping", in a state where only classification results up to Top 2 are shown, there is a possibility that the user may incorrectly classify it to "other agents for dental and oral use".

Even if the number of search results is large, all of the search results can be placed on one screen when the windows are shown in an overlapping manner. The user can check all of the search results by selecting a window appropriately. Note that it is possible to set, to the UI providing unit 110, the upper limit number of search results to be shown, and allow the UI providing unit 110 to display search results up to the upper limit number.

When the user looks at the search results of the web search and the search results of the classification standards shown on one screen, the user can efficiently compare the description of the product with the classification conditions in the classification standards. Therefore, the user can determine category of the product of the purchase data quickly.

Further, since all search results obtained through the search processing are shown as search results of classification standards, the user can comprehensively check classification conditions with respect to the product of the purchase data that is a classification application target on one screen, and can perform comparison with the description of the product efficiently.

At S104, the user selects a determined category on the screen. Note that the selection target (location of the screen to be clicked) may be any location within the column of the determined category or the category name. The UI providing unit 110 transmits classification information (category name, classification code, and the like) selected by the user to the data creation unit 130.

At S105, the data creation unit 130 creates mapping data that is data in which classification information is applied to the target purchase data, and stores the mapping data in the mapping data storage unit 160. At that time, as illustrated in FIG. 7, the UI providing unit 110 may display the created mapping data.

<Variations of Search Result Display>

The UI presenting unit 110 may display a screen in which the right and left of the example of FIG. 6 are inversed (web search results are on the right side, classification standards search results are on the left side).

Figure 8:
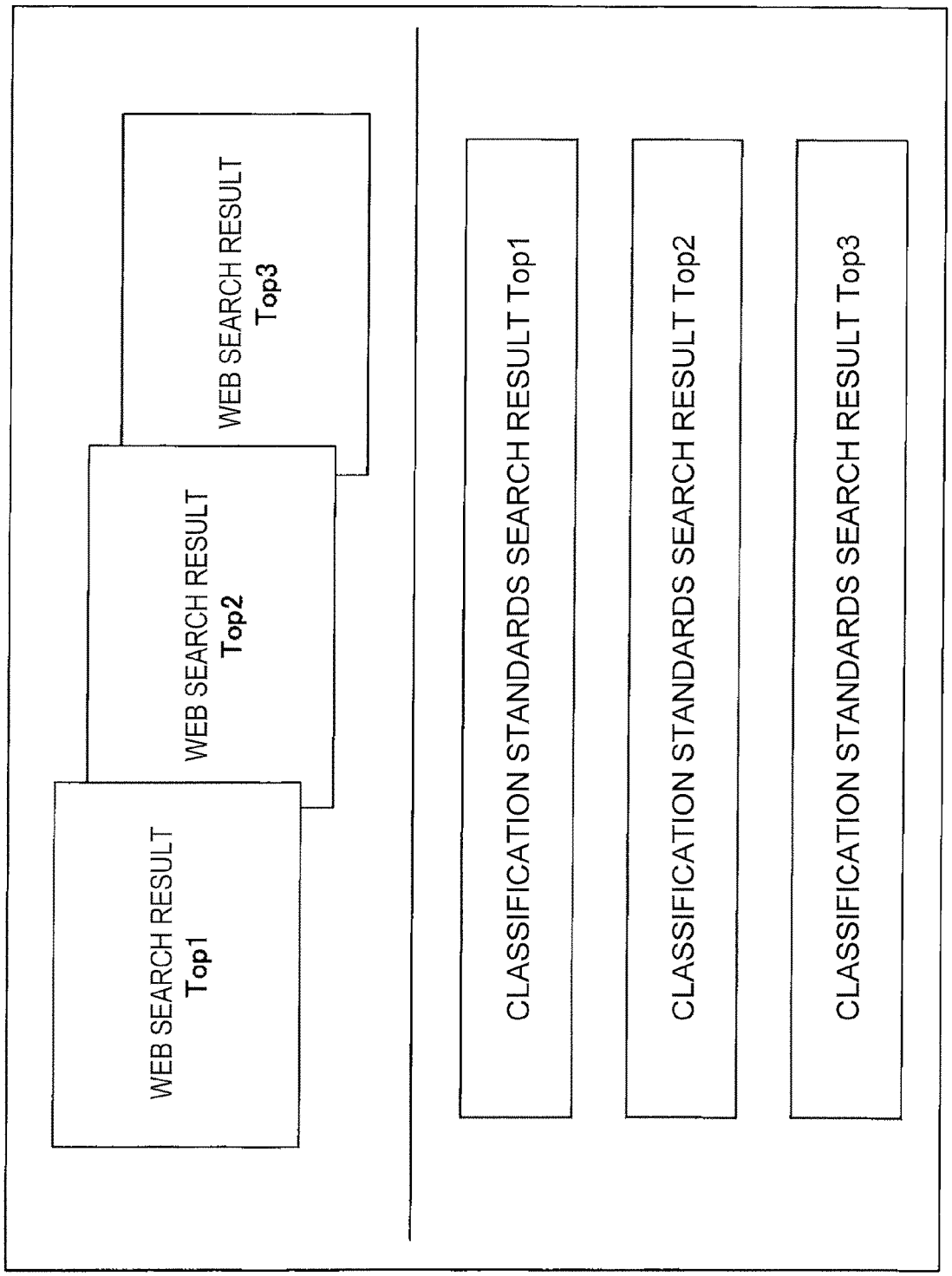
FIG. 8 illustrates an example of a screen displayed by the UI providing unit 110.

Further, as illustrated in FIG. 8, the UI presenting unit 110 may display the web search results and the classification standards search results on the upper side and the lower side. A screen in which the upper side and the lower side of the example of FIG. 8 are inversed is also be acceptable (web search results are on the lower side, classification standards search results are on the upper side).

<Addition of Keyword>

It is expected that the classification standards search results may also include those not related to the classification, besides those correspond to classification of the target product.

Therefore, when it is found that a category corresponds to a product, the product name thereof may be added to the column of the category of the classification standards, as a keyword.

Moreover, a keyword not included in a category may also be added so that the fact becomes understandable. For example, when "chapping" is not related to a category, a keyword such as NOT (chapping) may be added to the column of the category.

By performing such an addition, it becomes easy to search a category with a keyword related to a product corresponding to the category, and a category not related to the product is less likely to be searched with the keyword related to the product. Therefore, the search accuracy is improved.

Specifically, for example, in the case where the UI providing unit 110 displays search results as illustrated in FIG. 6, when a user finds a category in which a product name is displayed (example: Top 1 on the right side of FIG. 6), the user selects (clicks) the column (example: Top 1 on the right side of FIG. 6) of the category. Then, the UI providing unit 110 enables character input to the column, and the user inputs the product name. The UI providing unit 110 stores the classification standards to which the product name is added, in the classification dictionary storage unit 140. This also applies to a keyword such as NOT (chapping).

Addition of a keyword in the case of displaying both web search results and classification standards search results, as described above, is just an example. A user may cause the UI providing unit 110 and the search unit 120 to display an arbitrary location of the classification standards and input a keyword thereto.

<Weighting of Keyword>

The structure of the purchase data, illustrated as an example in FIG. 1(*b*) or the like, is different for each company. Therefore, for example, categorization of purchase data unique to one company (kosha (each company) categories) may match common classification, but kosha (each company) categories of another company may largely differ from the common classification. Therefore, in the search processing at S102 of FIG. 4, in the case of using those obtained by dividing the purchase data as they are, for example, search results of the classification standards based on the kosha (each company) categories may result in noise.

Therefore, it is also possible to allow the user to set a search weight to each word of purchase data. A weight can be set to each item constituting the purchase data and, in the case where one item is configured of a plurality of words, a weight can be set to each word. Assuming that an item is a word, a weight can be set to each word constituting the purchase data.

Figure 9:
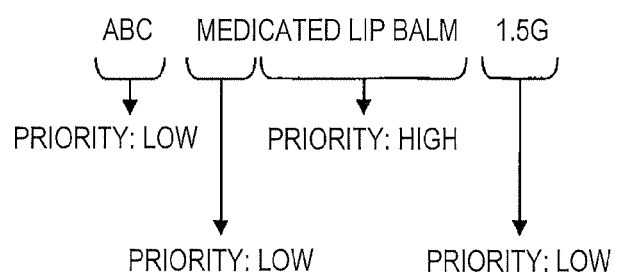
FIG. 9 illustrates an example of weighting applied to a keyword.

FIG. 9 illustrates an example of setting a weight to each word constituting a product name. In the example illustrated in FIG. 9, it is set the "lip balm" has a high weight (priority), and the rests are set to be low. The setting information (a set of word and weight for each word) is input to the UI providing unit 110, and is given to the search unit 120. The search unit 120 executes search processing according to the weight. For example, the search unit 120 executes search processing such that a search result corresponding to a word having a high weigh is shown in the high order. By setting a weight as described above, it is possible to perform search processing with higher accuracy.

Note that the set weight may be applied commonly to a web search and a classification dictionary search, or the weight for a web search and the weight for a classification dictionary search may be different.

FIG. 10 illustrates an example of screen display for weight setting. This screen is one displayed by the UI providing unit 110 when a piece of purchase data is selected at S101 of FIG. 4.

FIG. 10 illustrates the case where a weight is set to "ABC" in the product name. A user selects "ABC", and inputs (selects) a weight (low) in the weight input field. Thereby, the UI providing unit 110 notifies the search unit 120 of information indicating that the weight of ABC is low.

Summary of Embodiment

The present specification describes at least the technique of the sections provided below.

(Section 1)

A mapping support apparatus including a search unit that performs a web search by using a part or a whole of dictionary mapping target data as a search key, and performs a search on a predetermined classification dictionary using a part or a whole of the dictionary mapping target data as a search key;

a UI providing unit that displays a screen including a search result of the web search and a search result of the predetermined classification dictionary; and a data creation unit that applies, to the dictionary mapping target data, classification information selected by a user from the search result of the predetermined classification dictionary.

(Section 2)

The mapping support apparatus according to section 1, wherein the UI providing unit displays a predetermined number of search results among a plurality of search results of the web search obtained by the search unit, and displays all of a plurality of search results of the predetermined classification dictionary obtained by the search unit.

(Section 3)

The mapping support apparatus according to section 1 or 2, wherein the UI providing unit adds a keyword input by the user to the predetermined classification dictionary.

(Section 4)

The mapping support apparatus according to any one of sections 1 to 3, wherein the UI providing unit displays a screen enabling setting of a weight for a search to each of a plurality of constituent elements constituting the dictionary mapping target data, and sets weight information, input with respect to a constituent element by the user, to the constituent element.

(Section 5)

A mapping support method performed by a mapping support apparatus, the method including a search step of performing a web search by using a part or a whole of dictionary mapping target data as a search key, and performing a search on a predetermined classification dictionary using a part or a whole of the dictionary mapping target data as a search key;

a display step of displaying a screen including a search result of the web search and a search result of the predetermined classification dictionary; and a data creation step of applying, to the dictionary mapping target data, classification information selected by a user from the search result of the predetermined classification dictionary.

(Section 6)

A program for causing a computer to function as each of the units of the mapping support apparatus according to any one of sections 1 to 4.

While the present embodiment has been described above, the present invention is not limited to such a specific embodiment. Various modifications and changes can be made within the scope of the spirit of the present invention described in the claims.

REFERENCE SIGNS LIST

100 Mapping support device
110 UI providing unit
120 Search unit
130 Data creation unit
140 Classification dictionary storage unit
150 Target data storage unit
160 Mapping data storage unit
1000 Drive
1002 Auxiliary storage device
1003 Memory
1004 CPU
1005 Interface device
1006 Display device
1007 Input device

The invention claimed is:

1. A mapping support apparatus including a memory and a processor,
wherein the processor is configured to perform operations comprising:
performing a web search by using a part or a whole of dictionary mapping target data as a search key, and performing a search on a predetermined classification dictionary using a part or a whole of the dictionary mapping target data as a search key;
displaying a screen including a search result of the web search and a search result of the predetermined classification dictionary; and
applying, to the dictionary mapping target data, classification information selected by a user from the search result of the predetermined classification dictionary.

2. The mapping support apparatus according to claim 1, wherein
the displaying further comprises displaying a predetermined number of search results among a plurality of search results of the web search obtained by the search unit, and displaying all of a plurality of search results of the predetermined classification dictionary obtained by the search unit.

3. The mapping support apparatus according to claim 1, further comprising:
adding a keyword input by the user to the predetermined classification dictionary.

4. The mapping support apparatus according to claim 1, further comprising:
displaying a screen enabling setting of a weight for a search to each of a plurality of constituent elements constituting the dictionary mapping target data, and setting weight information, input with respect to a constituent element by the user, to the constituent element.

5. A mapping support method performed by a mapping support apparatus, the method comprising:
- performing a web search by using a part or a whole of dictionary mapping target data as a search key, and performing a search on a predetermined classification dictionary using a part or a whole of the dictionary mapping target data as a search key;
- displaying a screen including a search result of the web search and a search result of the predetermined classification dictionary; and
- applying, to the dictionary mapping target data, classification information selected by a user from the search result of the predetermined classification dictionary.

6. A recording medium storing a program for causing the units of the processor of the mapping support apparatus of claim 1 to perform the operations.

\* \* \* \* \*